April 9, 1940.   L. G. TOWNSEND   2,196,234
MEANS FOR COMPARATIVE DETERMINATION OF TRANSMITTED AND REFLECTED LIGHT
Filed May 27, 1938   3 Sheets-Sheet 1
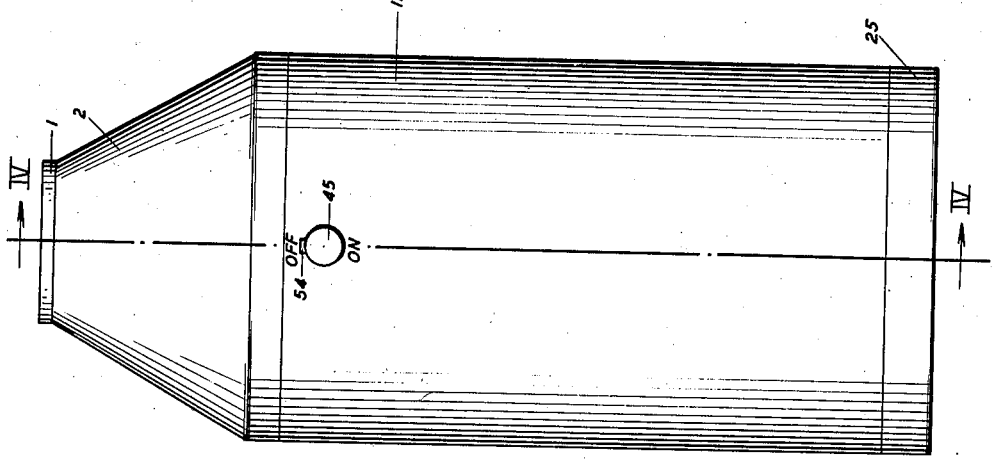
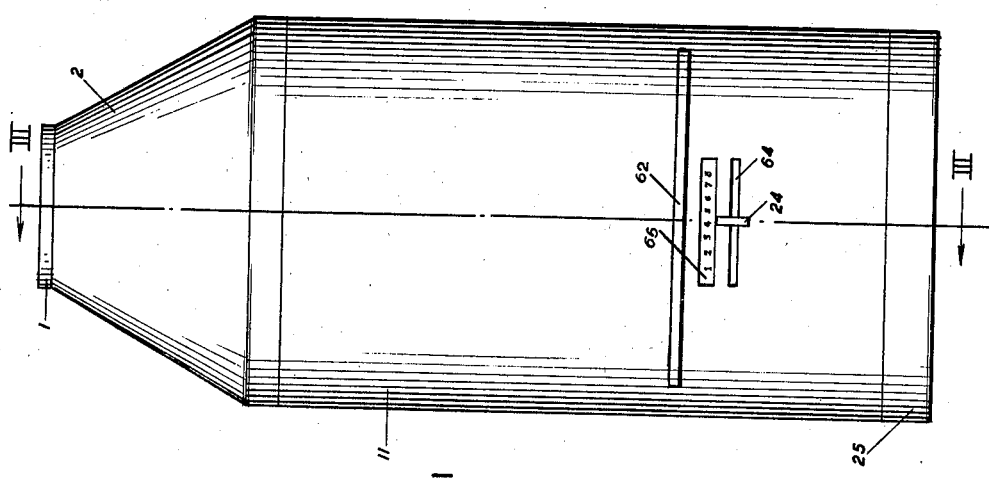
INVENTOR
LEONARD G. TOWNSEND
BY
ATTORNEY April 9, 1940.  L. G. TOWNSEND  2,196,234
MEANS FOR COMPARATIVE DETERMINATION OF TRANSMITTED AND REFLECTED LIGHT
Filed May 27, 1938   3 Sheets-Sheet 2
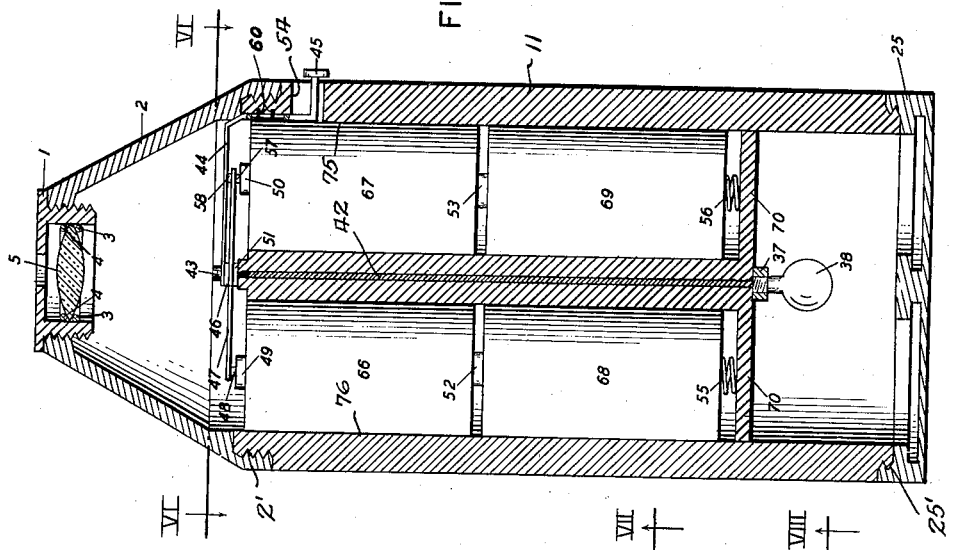
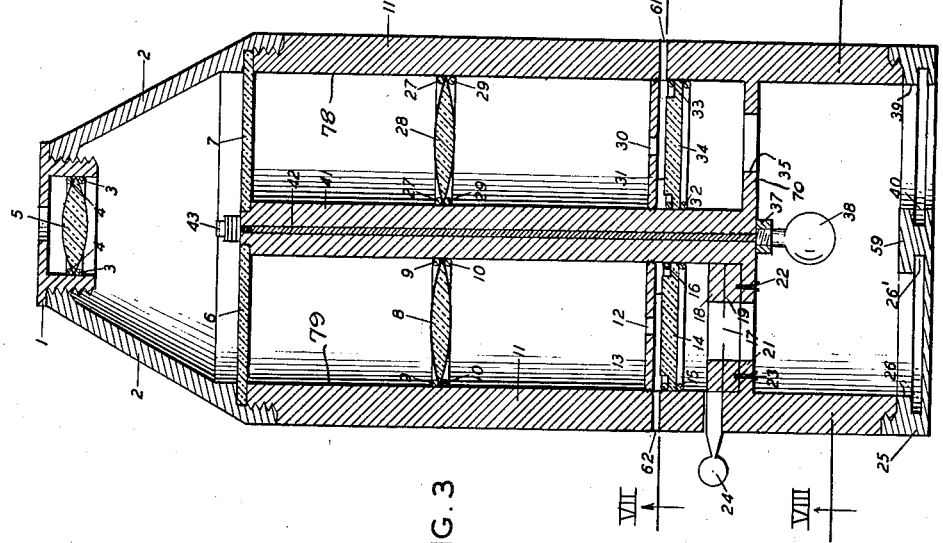
INVENTOR
LEONARD G. TOWNSEND
BY
ATTORNEY April 9, 1940.  L. G. TOWNSEND  2,196,234
MEANS FOR COMPARATIVE DETERMINATION OF TRANSMITTED AND REFLECTED LIGHT
Filed May 27, 1938  3 Sheets-Sheet 3

INVENTOR
LEONARD G. TOWNSEND
BY
ATTORNEY

Patented Apr. 9, 1940

2,196,234

UNITED STATES PATENT OFFICE 2,196,234

MEANS FOR COMPARATIVE DETERMINATION OF TRANSMITTED AND REFLECTED LIGHT

Leonard G. Townsend, Washington, D. C.

Application May 27, 1938, Serial No. 211,282

3 Claims. (Cl. 88—14)

(Granted under the act of March 3, 1883, as amended April 30, 1928; 370 O. G. 757)

This invention relates to a means for the comparative determination of transmitted and reflected light, and to microphotographic operations and to a means for determining the light required in these operations, as for example, for projecting a film or for photographing a page of printed matter and/or illustrations.

The light required for operations of this general class may vary widely. For instance, in photographing the pages of a book, a single page may have printed matter in large type and footnotes in very fine type and there may also be on the same page an illustration containing solid black and different degrees of shading. The next page of the same book may be printed with type of the same size or it may contain only a small illustration with a comparatively large area left unprinted. Frequently in old books or documents there is a discoloration of the paper due to age, and of course the paper may have been colored originally. It is highly desirable to be able to photograph material of this kind upon standard film, as upon the widely used 35 m. m. film. This involves a considerable reduction even when photographing pages from an ordinary book, and in some cases it may be desirable to photograph a large map, document, or the like. It will be evident that factors of the kind just mentioned must be considered when projecting a film as well as when endeavoring to obtain a clear negative, or to enlarge again upon paper.

The purposes of the invention are to provide a means for determining the light required for microphotographic operations of the class desired, comprising photographing material, preferably upon a film, and also for projecting such a record to give a clearly defined image for reading or enlargement purposes.

The features of the invention are illustrated in the accompanying drawings, wherein:

Fig. 1 is a front elevation of a device for determining the light required for operations of the class described;

Fig. 2 is a side elevation of the device shown in Fig. 1;

Fig. 3 is a section on the line III—III of Fig. 1;

Fig. 4 is a section on the line IV—IV of Fig. 2;

Figure 6:
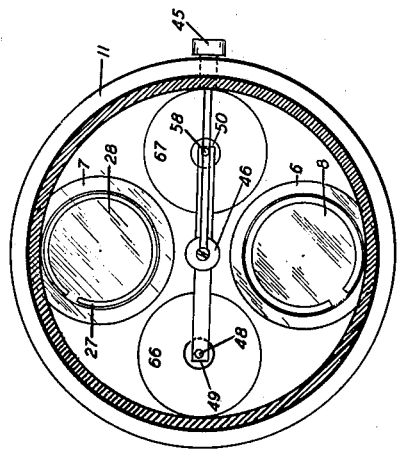
Fig. 6 is a section along the line VI—VI of Fig. 4.
Figure 8:
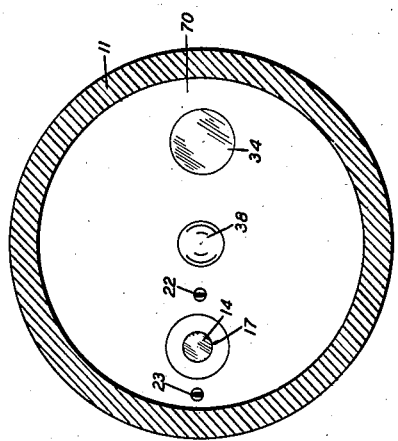
Fig. 8 is a section along the line VIII—VIII of Fig. 3.
Figure 5:
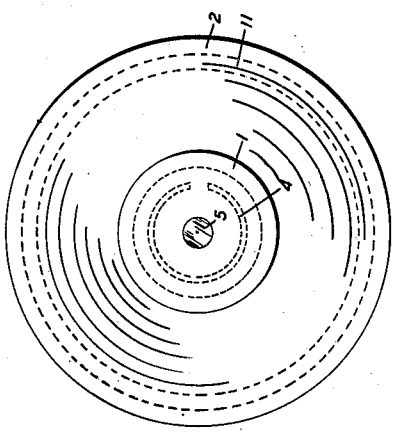
Fig. 5 is a top plan view of the device shown in Fig. 1.

The embodiment selected for illustration comprises a casing having a body 11 which is preferably cylindrical and is fitted on its lower end with a head or closure piece 25. This closure piece preferably is releasably attached to the body by means of a threaded connection 25'. An end piece or upper head 2, preferably substantially frusto-conical in form, has its larger end secured to the cylindrical body by a threaded connection 2'. A transverse partition 70 (Fig. 4) is arranged within the lower portion of the body and carries a centrally disposed, axially extending post 41. On opposite sides of this post as shown in Fig. 4, chambers 75 and 76 are provided to receive batteries 66, 67, 68, and 69 which, preferably, are dry cells of the type commonly used in flash lights and the like. The lowermost batteries 68 and 69 preferably are resiliently supported as by means of coil springs 55 and 56, which are grounded on the partition, and which insure perfect contact. The lowermost batteries 68 and 69 are provided on their upper ends with terminal posts 52 and 53 which engage the lower ends of the superposed batteries 66 and 67, respectively. A conductor 42 extends axially through the central post to one terminal of a light socket 37 which has its shell electrode grounded on partition 70. A light bulb 38 is mounted in this socket.

At the upper end of the central post the conductor may be electrically connected to a bar 44 by means of an attaching element, such as a screw 43 which extends through insulating washers 46 and 51 and is secured to the conductor. A suitable conductor, such as a contact bar 47 may be secured between the washers 46 and 51 in non-conducting relation with the conductor 42 and screw 43. The bar 47 carries at one end thereof a contact 48 engageable with terminal 49 of battery 66. At its other end this contact bar carries a contact 57 which is engageable with the terminal 50 of battery 67. The operating bar 44 carries a contactor 58 which is engageable with bar 47, preferably at a point directly above terminal 50 and contact 57. This operating bar extends across the casing above chamber 75 to the inner side wall where the bar is bent to extend longitudinally of the casing to a longitudinal opening 54 where the end of the operating bar extends outwardly through this opening and carries a thumb piece or button 45. This operating bar is slidably mounted upon the inner wall of the casing with sufficient friction to hold the bar in different positions of adjustment. This mounting may comprise screws 60 extending through a slot in the bar and having their heads engaging the bar to provide the desired frictional engagement. It will be understood that the slidably mounted bar 44 is insulated from the casing by suitable insulation (not shown). This operating bar is sufficiently resilient and flexible so that when the button 45 is moved upwardly, the bar bows or flexes upwardly between screw 43 and the casing and thereby moves contactor 58 away from bar 47 and opens the circuit at this point. It will be evident that when the parts just described are in the positions shown in Fig. 4, a circuit will be completed from batteries C⁷, 69 and also from batteries 66 and 68 through the contact bar, contactor 58, bar 44, screw 43 and through conductor 42 to the light bulb. When the thumb piece 45 is moved upwardly, this circuit will be opened at contactor 58 as just described.

Figure 7:
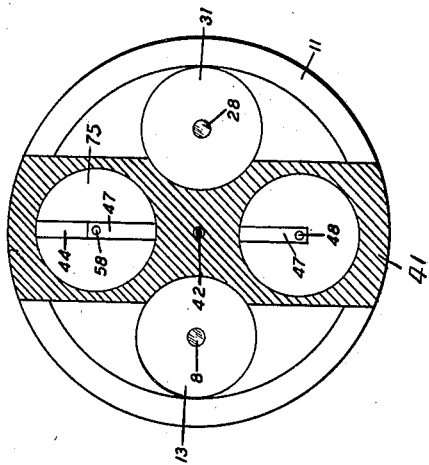
Fig. 7 is a section along the line VII—VII of Fig. 3.

As shown in Figs. 3, 6, and 7, the casing is also provided with longitudinally extending, cylindrical chambers or passages 78 and 79, which are arranged on opposite sides of the casing between chambers 75 and 76. View plates comprising pieces of opal glass or other translucent material 6 and 7 are mounted across the upper ends of chambers 79 and 78 respectively. At the lower ends of the latter chambers, partition 70 is provided with substantially equal openings 21 and 35. Mounted on partition 70 within chamber 79 as by means of attaching elements 22 and 23, there is an iris or diaphragm shutter 18, 19 of the well known type having an aperture 17 which is expansible and contractable in response to movement circumferentially of the casing of an operating lever 24, which extends through a casing slot 64 (Figs. 1 and 3).

At a level above this iris, chamber 79 is fitted with a transparent glass 14 adapted to serve as a support for a strip of film. This glass may be mounted in any approved manner, as by means of upper and lower snap rings 15 and 16. The body 11 of the casing has a radial slot 62 through which a strip of film or the like may be passed into chamber 79 to rest upon the upper surface of glass 14. Immediately above this slot a partition 13 extends across chamber 79 and is provided with a central aperture 12, which is preferably about 1 m. m. in diameter. This apertured partition constitutes a mask for concentrating reflected light. A double convex lens 8 is mounted in chamber 79 as by means of upper and lower snap rings 9 and 10. This lens is so spaced that its focal point is above aperture 12 as viewed in Fig. 3. This lens is adapted to focus reflected light on the opal glass viewing plate 6. In identically the same manner as that just described with reference to chamber 79, chamber 78 is also equipped with: a double convex lens 28 mounted by means of upper and lower snap rings 27 and 29; a partition or mask 31 having an aperture 30; a glass support plate 34 mounted by means of upper and lower snap rings 33 and 32; and a slot 61.

The lower head or closure piece 25 of the casing is provided with an opening 39, which is preferably circular in shape, and around the edge of this opening there is an annular groove 40. This opening 39 is arranged to be in alignment with chamber 78 when the head is attached to the body of the casing. This lower head is also provided with a circular recess 26 in alignment with chamber 79. The lower portion of this recess is enlarged in the form of an annular groove 26'. The opening 39 and recess 26 are separated by a centrally disposed piece 59 carried by the head.

The upper end piece or head of the casing is fitted with a bushing in the form of an eye piece 1 having a central aperture or sight opening. A double convex lens 5 is mounted in this bushing, preferably by means of upper and lower snap rings 4 and 3. The view plates 6 and 7, being translucent, bear easily seen images of the reflected light. The lens 5 renders all portions of the view plates visible and so magnifies the images of reflected light as to insure a perfect optical matching of their intensity. On the exterior of the body 11 an index plate 65 (Fig. 1) is mounted adjacent the path of movement of operating handle 24 of the iris or diaphragm shutter 18, 19.

When the device disclosed herein is to be used for determining the relative reflectivity of material to be photographed, a layer of standard white, such as titanium oxide sphere paint, is applied in the bottom of recess 26 and in groove 26' of this recess. This may be accomplished conveniently by applying the paint to a flexible disk (not shown) which may be bowed sufficiently to snap into groove 26' and lie flat in the bottom of the recess. The thumb piece 45 is then pressed down to the position illustrated in Fig. 4, so as to complete the electrical circuit through the light bulb, as previously described herein. The device is then placed above the material to be tested with the unobstructed opening 39 above the area to be tested. When this is done, light from the single light bulb will be reflected on the standard white in recess 26 through opening 21 and through the iris, and light from the same source will be reflected from the area within the opening or hole 39 through the opening 35. As openings 21 and 35 are of the same size, it will be evident that reflected light passing to the iris will have a greater degree of intensity than light which is reflected from the material being tested through opening 35.

Reflected light from the material being tested passes from opening 35 through transparent glass 34, aperture 30, and the double convex lens 28 to opal glass 7 in a manner well understood by those skilled in this art. Similarly, reflected light from the standard white passes from opening 21 through the iris, aperture 12 and the double convex lens 8 to opal glass 6. An operator, by looking through the sight opening in the eye piece and lens 5, may readily observe on the opal glasses 6 and 7 the difference in the degree of intensity of reflected light from the two sources. By moving the iris operating lever 24 to reduce the size of the iris aperture, the intensity of the reflected light in chamber 79 may be reduced until it is substantially equal to the intensity of reflected light in chamber 78. This comparison is made by observing opal glasses 6 and 7 through lens 5. When it is noted that the intensity of light in chambers 78 and 79 is substantially the same, the position of the iris operating lever will indicate a certain reading on the index plate 65. This plate is marked off numerically to constitute a standard calibration and by looking up this reading in tables prepared for this purpose, the light required and the correct exposure for a photograph of the tested material may be ascertained. It will be understood that several selected areas of the material to be photographed may be tested in this manner, if this seems advisable.

When the device disclosed herein is to be used for determining the light or exposure required for projecting a certain translucent material such as a film, standard white, preferably in the form of flexible discs, is fitted in opening 39 by snapping such a disc into groove 40, and in the same manner as previously described, a standard white disc may be fitted into groove 26' of recess 26. The translucent material to be tested, such as a film, is inserted in slot 61 above the transparent glass and below aperture 30. A standard translucent material is inserted through slot 62 above the transparent glass and below the aperture 12. This standard translucent material is prepared by photographing a standard white, such as a surface covered with titanium oxide sphere paint. This paint provides a so-called "perfect" reflecting substance which is photographed upon a strip of photographic film at a given exposure time and the film is processed in a standard manner with standard chemical solutions under certain conditions.

When the circuit is completed through the light bulb, light is reflected from standard white in recess 26 into chamber 79, and from standard white in opening 39 and groove 40 into chamber 78. When this is done it will be evident that the reflected light in chamber 79 will usually have a different degree of intensity than the reflected light in chamber 78. The iris operating lever is moved to adjust the iris aperture until the observer notes that the intensity of reflected light, as indicated by the opal glasses, is the same in both chambers. The position of operating handle 24 then indicates a certain reading on the index plate 65 and by referring this reading to the proper set of tables, the required exposure for the tested translucent material may be ascertained. It is then assured that the same photographic results will be obtained with the tested translucent material as with the standard translucent material.

From the foregoing it will be evident that the invention is useful and may be used advantageously in various fields for the comparative examination of the light reflective ability of substances such as textiles, fibers, metals, etc., and for comparing the translucency as well as the transparency of light transmitting media; and also in criminological work for the comparative examination of documents and the like for authenticity, as by examining such documents as to age, identity of source, etc.

While the preferred manner and process of making and using the invention, and the principle thereof and the best known mode of applying that principle have been illustrated and described herein, various modifications will occur to those skilled in the art, when informed by this specification, but it is to be understood that the invention is not limited except as indicated by the appended claims.

This invention may be manufactured and used by or for the Government of the United States for all governmental purposes without the payment of any royalty.

Having thus described my invention what I claim is:

1. In an optical testing device, the combination of a body member having similarly disposed and alternately spaced battery chambers and passages for transmitted and reflected light arranged substantially symmetrically about a central axis, view plates disposed transversely of said passages adjacent one end of the body member, a partition disposed transversely of said battery chambers adjacent the other end of the body member and providing a support for batteries disposed in said chambers, said partition having suitable openings opposite said passages thereby providing optical axes between the view plates and said other end of the body member, the portion of the body member between said passages and said chambers constituting a central post extending substantially from said partition to said one end of said body member, said post having a longitudinal bore for receiving a conductor, a lamp socket mounted on the side of said partition facing said other end of said body member and in the space between said passages, a lamp bulb mounted in said socket, a conductor extending from said socket through said bore in said post to said one end of the body member, a switch mounted adjacent said one end of said body member, and means operable by said switch for completing and for interrupting the circuit between said conductor and batteries disposed in said battery chambers.

2. In an optical testing device, the combination of a body member having similarly disposed and alternately spaced battery chambers and passages for transmitted and reflected light arranged substantially symmetrically about a central axis, view plates disposed transversely of said passages adjacent one end of the body member, a partition disposed transversely of said battery chambers adjacent the other end of the body member and providing a support for batteries disposed in said chambers, said partition having suitable openings opposite said passages thereby providing optical axes between the view plates and said other end of the body member, the portion of the body member between said passages and said chambers constituting a central post extending substantially from said partition to said one end of said body member, said post having a longitudinal bore for receiving a conductor, a lamp socket mounted on the side of said partition facing said other end of said body member and in the space between said passages, a lamp bulb mounted in said socket, a conductor extending from said socket through said bore in said post to said one end of the body member, a switch mounted adjacent said one end of said body member, said switch comprising an arm extending from said conductor to the exterior of the body member, means for supporting said arm on the body member for movement longitudinally thereof, and means responsive to longitudinal movement of said arm of said switch for completing and for interrupting the circuit between said conductor and batteries disposed in said battery chambers.

3. In an optical testing device, the combination of a body member having similarly disposed and alternately spaced battery chambers and passages for transmitted and reflected light arranged substantially symmetrically about a central axis, view plates disposed transversely of said passages adjacent one end of the body member, a partition disposed transversely of said battery chambers adjacent the other end of the body member and providing a support for batteries disposed in said chambers, said partition having suitable openings opposite said passages thereby providing optical axes between the view plates and said other end of the body member, the portion of the body member between said passages and said chambers constituting a central post extending substantially from said partition to said one end of said body member, said post having a longitudinal bore for receiving a conductor, a lamp socket mounted on the side of said partition facing said other end of said body member and in the space between said passages, a lamp bulb mounted in said socket, a conductor extending from said socket through said bore in said post to said one end of the body member, a switch mounted adjacent said one end of said body member, said switch comprising an arm extending from said conductor to the exterior of the body member, means for supporting said arm on the body member for movement longitudinally thereof, a conducting bar extending across said post and transversely of said battery chambers for completing the circuit between batteries disposed in said chambers, and means responsive to longitudinal movement of said arm of said switch for completing and for interrupting the circuit between said arm and said conducting bar.

LEONARD G. TOWNSEND.